Figure 1:
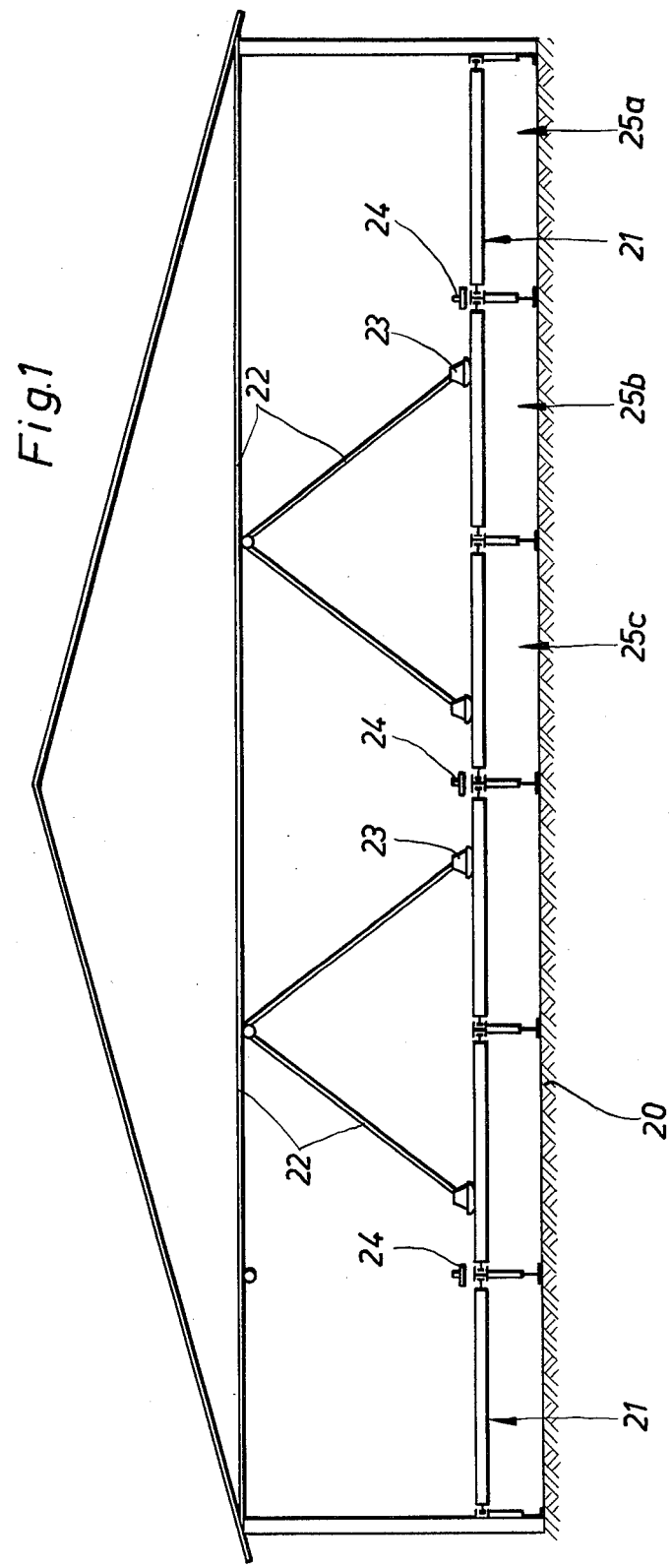

United States Patent [19]

Nagel et al.

[11] 4,430,960
[45] Feb. 14, 1984

[54] ARRANGEMENT FOR KEEPING FATTENED POULTRY

[75] Inventors: Hans J. Nagel, Contrescarpe 27, D-2800 Bremen 1, Fed. Rep. of Germany; Egon Schumacher, Barnstorf, Fed. Rep. of Germany

[73] Assignee: Hans Joachim Nagel, Bremen, Fed. Rep. of Germany

[21] Appl. No.: 318,175

[22] Filed: Nov. 4, 1981

[30] Foreign Application Priority Data

Nov. 7, 1980 [DE] Fed. Rep. of Germany ....... 3042043

[51] Int. Cl.³ ............................................... A01K 31/00
[52] U.S. Cl. ........................................ 119/22; 119/28; 198/698
[58] Field of Search ...................... 119/12, 21, 22, 28, 119/82; 198/698, 848, 850

[56] References Cited

U.S. PATENT DOCUMENTS

| | | | |
|---|---|---|---|
| 3,262,549 | 7/1966 | Stewart et al. | 198/850 X |
| 3,349,893 | 10/1967 | Jordan et al. | 198/688 |
| 3,618,747 | 11/1971 | Hammond | 198/848 |
| 4,018,271 | 4/1977 | Jones et al. | 119/28 X |
| 4,020,793 | 5/1977 | Morrison | 119/22 X |
| 4,213,422 | 7/1980 | Nagel et al. | 119/22 X |

FOREIGN PATENT DOCUMENTS 1964021 7/1971 Fed. Rep. of Germany ........ 119/28

*Primary Examiner*—Robert P. Swiatek
*Attorney, Agent, or Firm*—Sughrue, Mion, Zinn, Macpeak & Seas

[57] ABSTRACT

An apparatus for housing poultry to be fattened includes a grate-shaped animal conveyor supporting floor 21 which is contained within a housing enclosure. The floor is formed by a plurality of intersecting supporting profiles 33, each made from a soft, elastic material which is arranged so that it provides a plurality of openings 34 in the floor through which poultry droppings may pass. A plurality of soft, elastic coverings 40 are formed in a region above the supporting members 38 that are used to support the floor, the elastic coverings 40 providing extremely soft and yielding raised surfaces against which the poultry can lean, sit, or stand.

20 Claims, 10 Drawing Figures

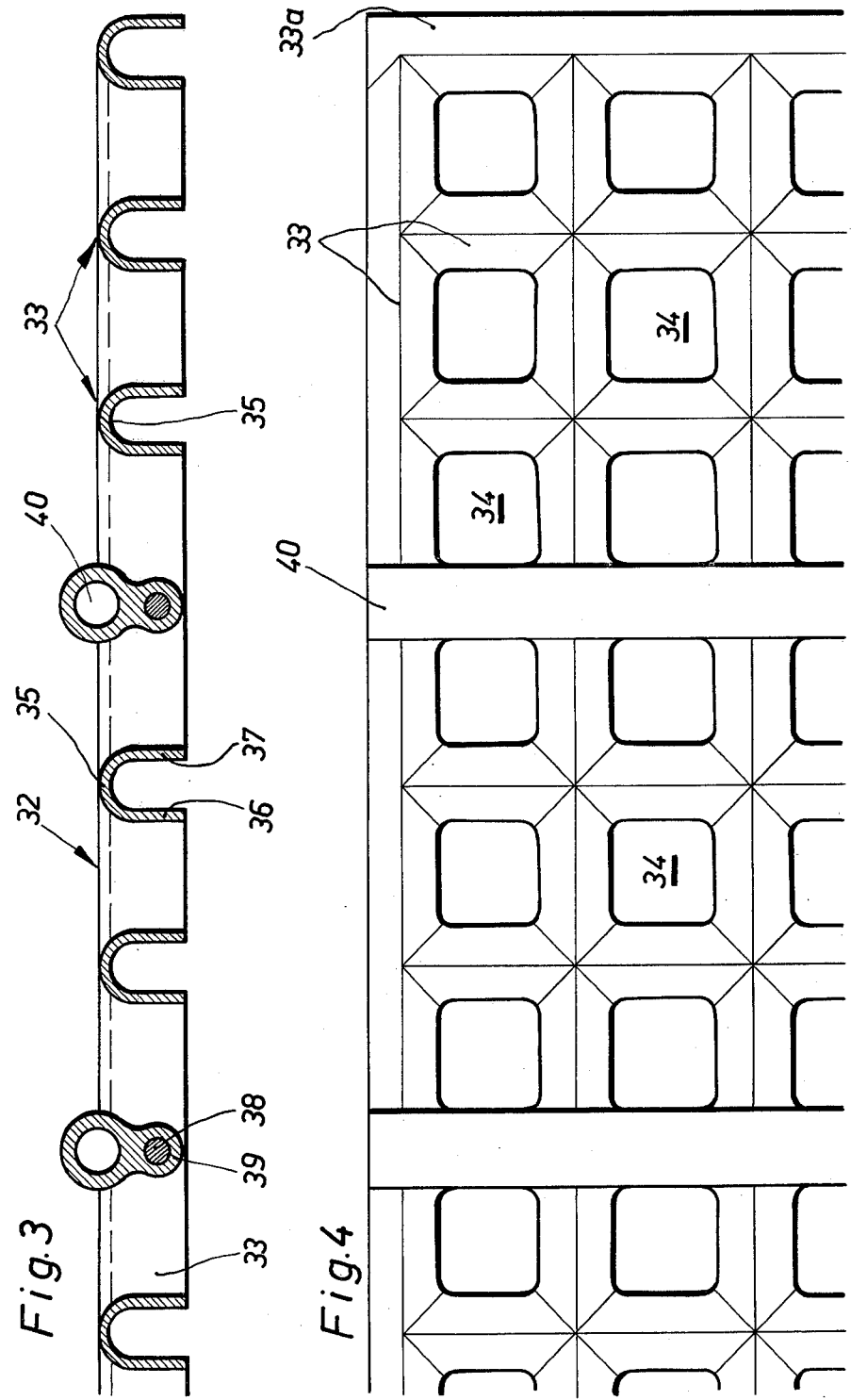

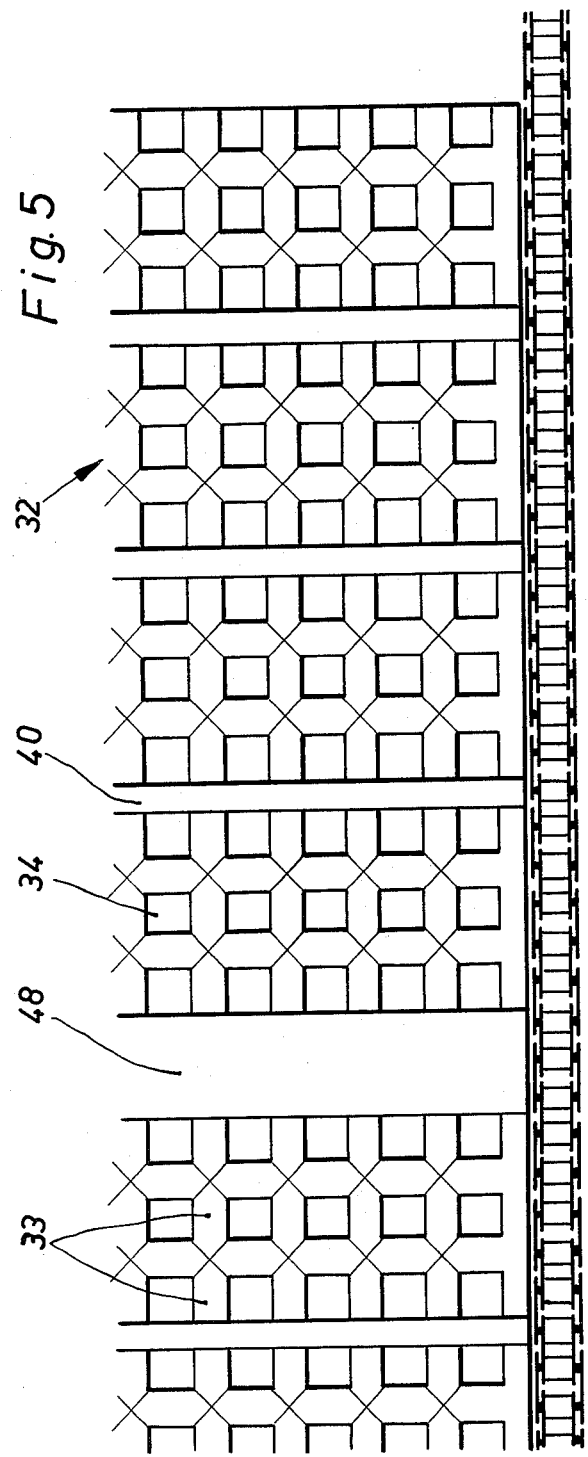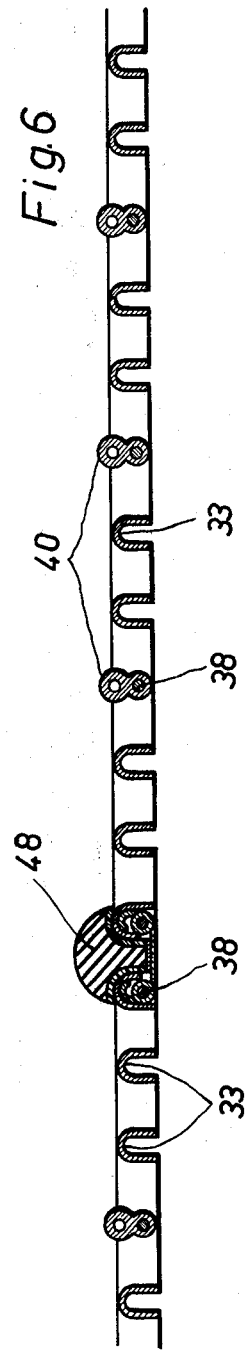

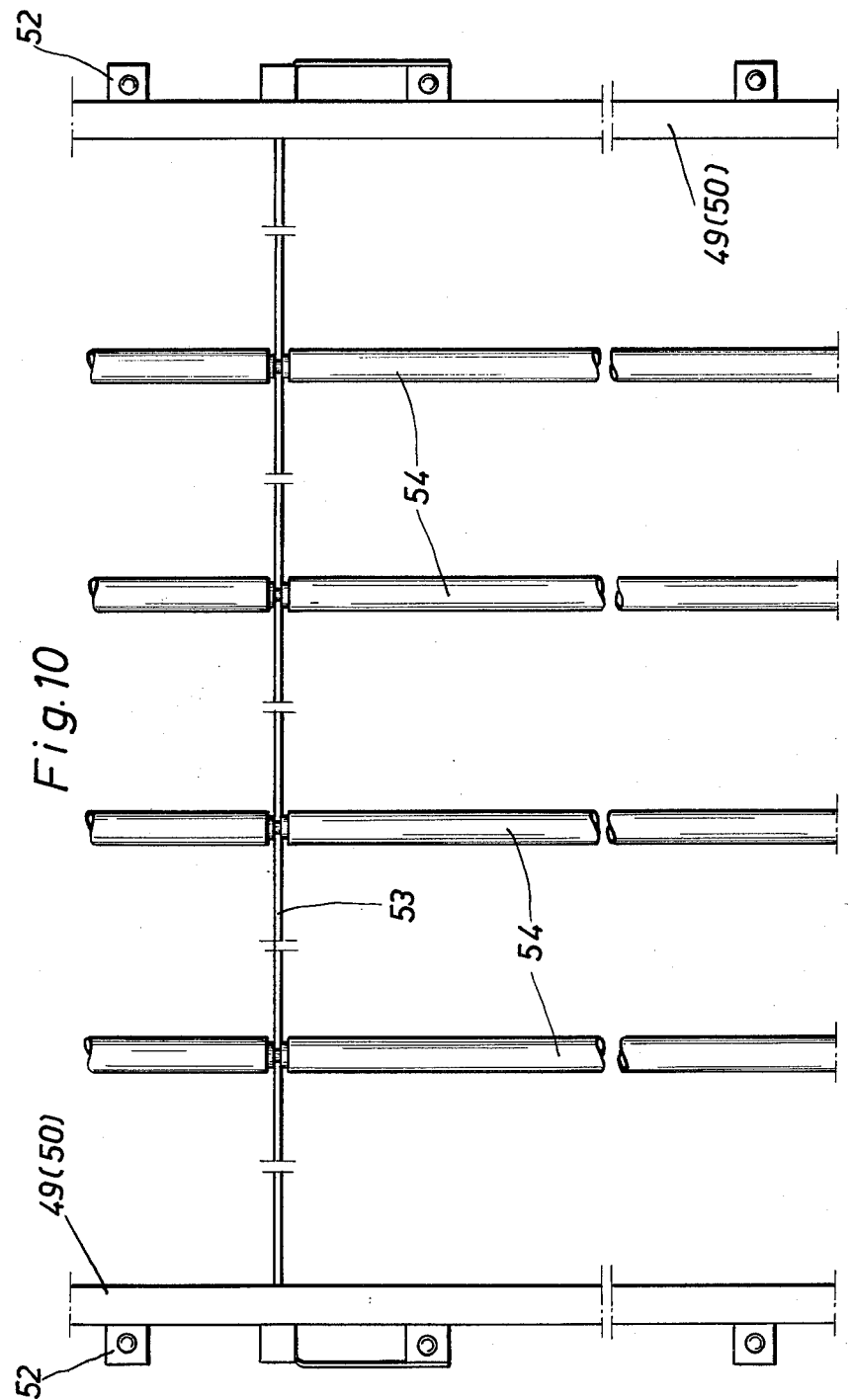

1

ARRANGEMENT FOR KEEPING FATTENED POULTRY

DESCRIPTION

The invention relates to an arrangement for keeping small animals, especially fattened poultry such as chickens, in a housing enclosure with a continuous grate-shaped floor designed as a conveyor.

The breeding of fattened poultry, especially chickens, takes place in large-area housing enclosures on a continuous enclosure floor. The chickens reared in a housing enclosure are, at the same time, transported away when they have reached the desired weight.

To facilitate this removal which is a problem in the keeping of small animals, it has already been proposed to provide above the enclosure floor a grateshaped supporting floor which is designed as a conveyor belt. The supporting floor consisting of individual tracks located next to one another is moved to one side of the housing enclosure, carrying the chickens along with it. In a region where the supporting floor is deflected, the chickens pass on to a transversely directed conveyor belt to be conveyed away out of the housing enclosure (German Auslegeschrift No. 2,703,968).

In this known proposal, the supporting floor or the tracks of this consist of individual grate bars made of plastic which are articulated to one another. These are arranged rotatably by means of bearing sleeves on transversely directed supporting bars. Such a design of the supporting floor or the tracks of this has proved unfavourable in practice. The resting base is too hard for the sensitive animals. Because of the ribs, pressure points arise, especially in the region of the animals' breasts, when they rest on the supporting floor for a relatively long time. Furthermore, the relative movement between the grate elements or bars is unfavourable because of the danger of soiling, the clogging of dung and the like.

The object of the invention is to develop further and improve an arrangement of the type mentioned in the introduction, in such a way that the disadvantages of hitherto known systems are eliminated. In particular, its aim is to provide a supporting floor befitting the biological peculiarities of small animals (chickens).

To achieve this object, the arrangement according to the invention is characterised in that the floor consists of intersecting supporting profiles made of an elastic, soft material, especially soft PVC.

Consequently, the supporting floor consists no longer of members movable relative to one another, but of a continuous grating or network comprising intersecting supporting profiles connected without joints to one another.

The special choice of material - especially soft PVC - gives rise, on the one hand, to an elasticity of the supporting floor or tracks made of this, so that they can be deflected like conveyor belts. On the other hand, it results in a bearing surface which befits the animals in question and which is equipped with a soft surface of supporting elements (supporting profiles). The supporting profiles of the grating, which are preferably made in a dipping process, have a very smooth and easily deformable surface which allows the animals both to move and to rest free of stress on the supporting floor. The dimensions of the supporting profiles are such that, on the one hand, the pressure stress for the resting animals is drastically reduced, but, on the other hand, the natural movement of the animals is made easier.

According to the invention, the supporting profiles are designed as elongate hollow bodies, especially with an approximately U-shaped cross-section, a rounded arcuate web of the profile being directed upwards and serving as a bearing face, whilst the legs of this profile point downwards. Because the supporting profiles are designed to be open downwards, deformability is increased, whilst the loading capacity remains sufficient.

According to a further proposal of the invention, the supporting floor or the tracks of this are provided with elevations, especially ribs, beads and the like, which project beyond the floor plane. These also consist of soft, elastic material and are made with rounded surfaces. These elevations located at a distance from one another form seating surfaces which befit the animals in question and which also ensure that the sensitive breast parts are not exposed to any stresses during the time when the animals rest on elevations of this type.

According to the invention, the individual tracks consist of one-part or one-piece mats in the design described. In the conveying or longitudinal direction of a track, several mats adjoin one another to form this track and are connected to one another free of gaps, preferably by a special snap connection which forms a covering profile at the top with a bead-like elevation.

The mats are provided, at intervals, with transversely directed supporting or upholding members, especially embedded supporting rods, which are connected to laterally running conveying members (conveyor chains). The above-mentioned supporting rods give the highly flexible mats an upholding support in a transverse direction. Furthermore, they guarantee the best possible transmission of the conveying drive.

According to the invention, elevations, preferably in the form of continuous hollow bodies, are shaped on and above the supporting rods. As a result, the mat has a soft and resilient effect even in the region of these supporting rods.

Further features of the invention relate to the connection of the mats to one another and to supporting constructions for the supporting floor.

Figure 2:
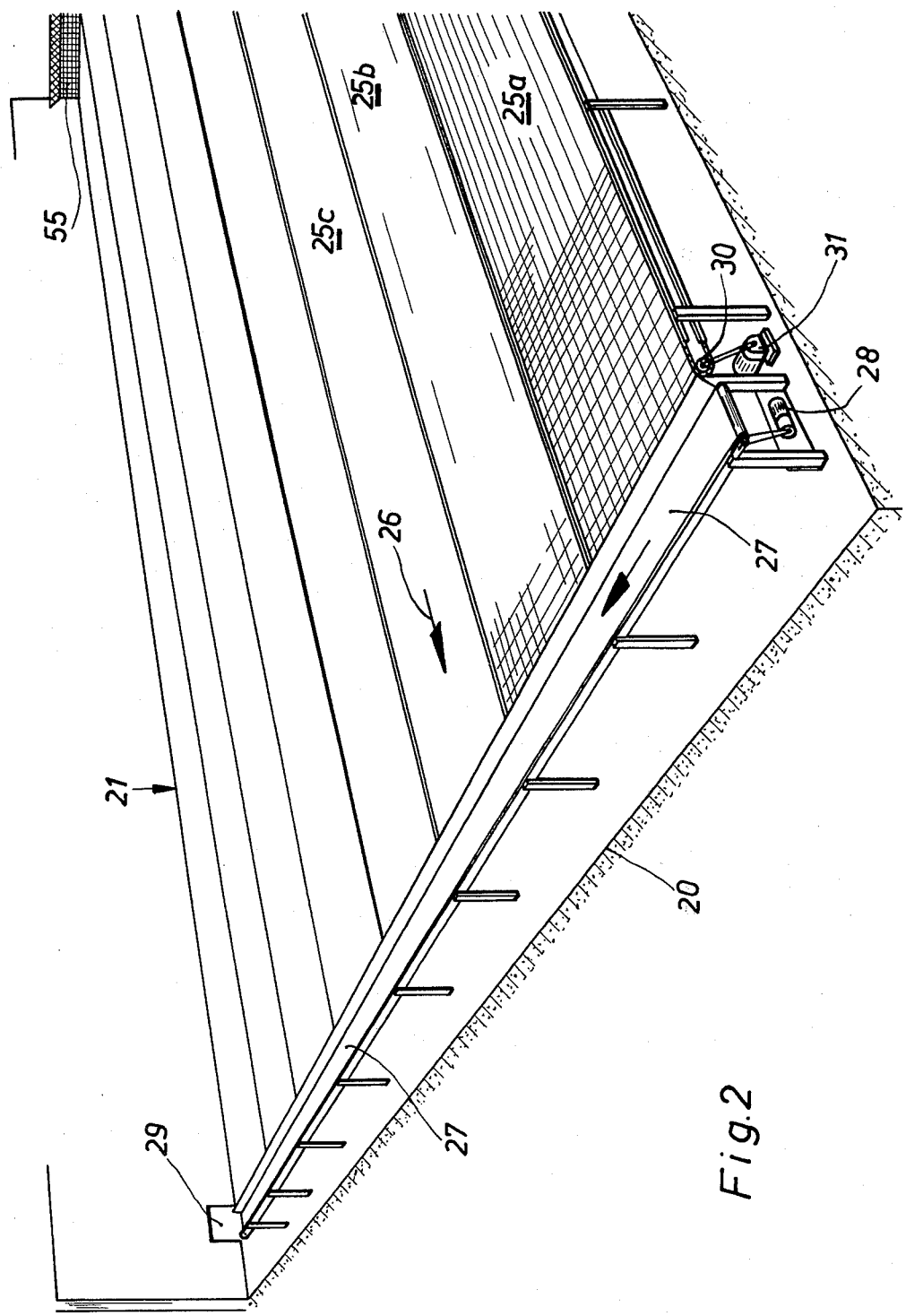
Figure 7:
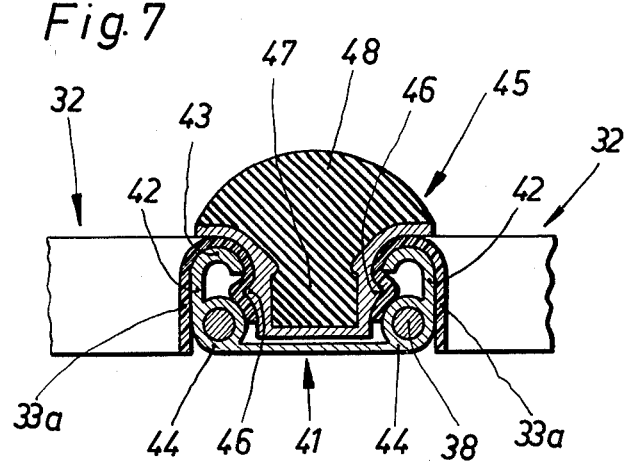
Figure 8:
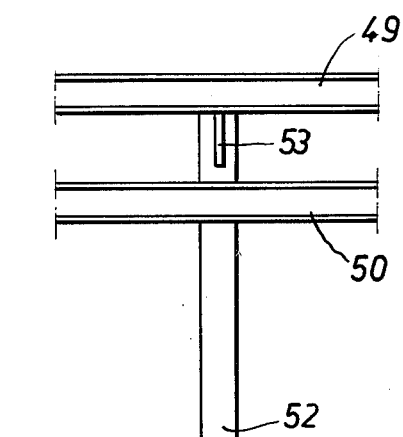
Figure 9:
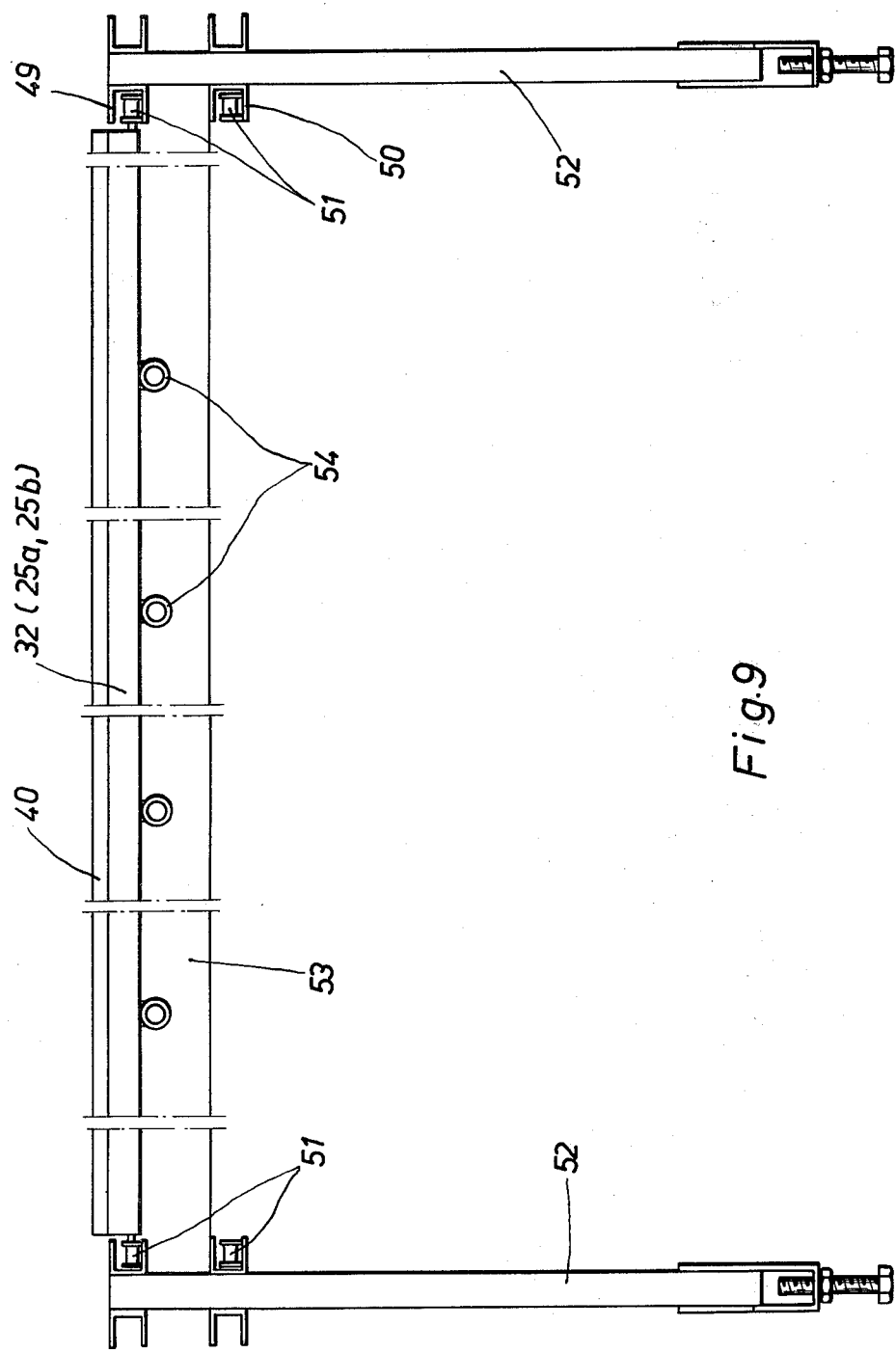

Exemplary embodiments of the invention are explained in more detail below with reference to the drawings in which:

FIG. 1 shows a cross-section through a housing enclosure designed according to the invention, greatly simplified, FIG. 2 shows a cut-out of the housing enclosure and of a supporting floor, in a perspective representation, FIG. 3 shows a longitudinal section through a part of the supporting floor on an enlarged scale, FIG. 4 shows a cut-out of the supporting floor in a plan view, FIG. 5 shows a larger region of the supporting floor with a lateral conveying member, in a plan view, FIG. 6 shows a longitudinal section relating to the detail according to FIG. 5, FIG. 7 shows a cross-section in the region of the connection of two mats, on an enlarged scale, FIG. 8 shows a detail of a supporting construction for the supporting floor, namely a leg, in a side view, FIG. 9 shows cross-section through a track of the supporting floor with the supporting framework, FIG. 10 shows a plan view relating to FIG. 9.

FIG. 1 illustrates, in a diagrammatic cross-section, a housing enclosure for accommodating, for example, breeding chickens. Within the housing enclosure, a supporting floor 21 is located above an enclosure floor 20 at a distance from the latter. This supporting floor forms the running and standing surface for the animals. A system of tubes 22 for supplying feed appliances 23 is provided above the supporting floor 21. Furthermore, separate drinking devices 24 also extend above the supporting floor 21.

The supporting floor 21 as a whole, is designed, as a conveyor for the animals and can be moved over the full width of the housing enclosure, while in view. For this purpose, the supporting floor 21 is subdivided into individual tracks 25a, 25b, 25c. These are appropriately moved together and simultaneously in the conveying direction (arrow 26 in FIG. 2).

In the present exemplary embodiments, the transport movement of the tracks 25a, 25b, etc., runs to a cross-conveyor 27 which is located here at the margin of the housing enclosure. As a result of the corresponding movement of the supporting floor 21, the animals are delivered to the cross-conveyor 27 and deposited on this. The cross-conveyor 27 is driven transversely to the supporting floor 21 by a motor 28. The animals are transported away, for example, through an aperture 29 in the enclosure wall.

The flexible or deformable tracks 25a, 25b, etc. run over deflecting rollers 30 at their ends. FIG. 2 shows the deflecting roller 30 which faces the cross-conveyor 27 and which is, at the same time, a driving roller for the tracks 25a, 25b, etc. The deflecting roller 30 is driven by a motor 31.

The tracks 25a, 25b, etc. are designed in a special way. They consist of individual mats 32 which are connected to one another and which form a continuous track. Located next to one another, the tracks form, in return, the continuous supporting floor 21.

The mats 32 consist essentially of a mesh or grating comprising longitudinally and transversely directed supporting profiles 33 made of a soft and highly elastic material, especially PVC. In the present case, the supporting profiles 33 connected to one another leave free square grate apertures 34, the size of which is adapted to the natural peculiarities of the animals. The following dimensions have proved to be favourable: the supporting profiles 33 have a width of 13 mm. The free edge length of the grate apertures 34 is 18.75 mm. This results in a centre-to-centre distance between the supporting profiles 33 of 31.75 mm. The height of a supporting profile 33 is envisaged at 16 mm. The length of a mat 32 in the longitudinal direction of the track 25a, 25b, etc. amounts to 394 mm here, whilst the width and therefore the width of the track, is envisaged at 1918 mm.

In the exemplary embodiment shown, the supporting profiles 33 have a U-shaped cross-section, with an arcuate or semi-circular web 35 pointing upwards and with legs 36 and 37 pointing downwards. The supporting profiles 33 are therefore open downwards. The seating or lying surface on the supporting profiles 33 is rounded because the choice of material is soft and smooth. The wall thickness of the supporting profiles can amount to 2 mm.

To stiffen the mats 32 against sagging, but also to connect these to a conveying device yet to be described, stiffening or supporting members are introduced into the mats 32. In the present exemplary embodiment, transversely directed supporting rods 38 are shaped, at distances from one another, into the mats 32. The supporting rods 38 extend, in the lower cross-sectional region of the mat 32, in a profile 39 which is circular in the present case. The exemplary embodiment shown is equipped with three supporting rods 38 of this type within the mat 32.

To avoid creating increased resistance of the mats 32 to pressure in this region, soft and elastically resilient coverings are provided above the supporting rods 38, specifically in the form of continuous hollow bodies 40 made of the material of the mat 32. The hollow bodies 40 designed with a circular cross-section extend above the plane of the mat 32 approximately with half their cross-section, thereby forming a bead-like elevation extending over the mat 32. This elevation serves as a rest or support for the animals.

The mats 32 of a track 25a, 25b, etc. are connected largely without joints to one another in the longitudinal direction of the latter, specifically over the entire width of the track. In the present exemplary embodiment, special mat couplings consisting of two clamping profiles are provided (FIG. 7). A lower profile 41 engages with fitting clamping legs 42 from below into a supporting profile 33a at the margin of the mats 32 to be connected to one another. The cross section of the supporting profile 33a is largely filled by the clamping leg 42 specifically by an upper supporting arc 43 and by a tubular profile 44 extending in the lower region.

An upper profile 45 is introduced, namely pressed, into the trough-shaped lower profile 41 from above, and this upper profile makes a snap connection with the lower profile 41, the supporting profiles 33a being clamped in. Continuous noses 46 located laterally on the upper profile 45 engage into the region between the supporting arc 43 and tubular profile 44 of the clamping legs 42, specifically with the facing legs 36 and 37 respectively of the supporting profile 33a being pressed in and deformed. Because of the relatively rigid lower profiles 41 and upper profiles 45, a continuous, load-bearing connection is provided over the full width of the track 25a, 25b, etc., and this connection can easily be made and broken again on the spot.

The upper profile 45 or the supporting part of this is expanded upwards in the form of a shell. A soft and highly elastic filling material, especially foam material 47, is introduced into the open cavity formed in this way. This foam material projects upwards above the upper profile 45 and beyond the plane of the mat 32 and forms an elastic, soft bead 48. This acts as a soft, resilient covering for the otherwise rigid mat coupling and, at the same time, as an elevation allowing the animals to sit or lie thereon.

The tracks 25a, 25b, etc. are supported in lateral guides, namely in U-shaped supporting rails 49, 50. The upper supporting rails 49 serve for receiving the upper run of endless conveyor chain 51 and the lower supporting rails 50 serve for receiving its lower run. The supporting rails 49, 50 are each located on both sides of vertical supporting legs 52 arranged centrally between adjacent tracks 25a, 25b, etc. The upper supporting rails 49 end flush with the supporting legs 52.

The tracks 25a, 25b, etc. or mats 32 are connected to the conveyor chains 51 by means of the supporting rods 38 already described. The ends of the supporting rods 38 engage into hollow bolts of the chains 51, so that a direct connection to these is provided.

To ensure that exact guidance and conveyance is provided even in the region of the critical mat couplings, the tubular profiles 44 of the clamping legs 42 of the lower profile 41 are each provided likewise with continuous supporting rods 38.

The supporting legs 52 are connected to one another by transverse girders 53 which are designed here as flat profiles. Longitudinal supports 54, designed here as tubes, extend between the transverse girders 53 which are located at distances from one another in the longitudinal direction of the tracks 25a, 25b, etc. Several longitudinal supports 54 of this type are arranged next to one another within a track 25a, 25b, etc. The longitudinal supports 54 rest in recesses of the transverse girders 53 in the upper region of the latter.

The longitudinal supports 54 fulfil a multiple of functions; on the one hand, they serve for stiffening the supporting framework for the tracks 25a, 25b, etc.; on the other hand, they serve as bearing supports for the mats 32, so that these cannot sag excessively. Finally, the longitudinal supports 54 designed as hollow bodies (tubes) can be used as continuous heating elements if a heating medium, especially heated water, is passed through the longitudinal supports 54 connected to one another. By means of this heating system provided underneath the supporting floor 21, it is possible to guarantee the best possible temperature control in the housing enclosure directly in the region where the animals reside. The heating system can also be designed in another way and be located underneath the supporting floor 21.

The construction and mode of operation of the supporting floor 21 designed as described are such that the latter is designed only as an upper run. Consequently, there are no tracks 25a, 25b, etc. in the region of the lower run of the conveyor chain 51. If such tracks are set in motion to remove the animals from the housing enclosure, a transversely directed catching grid 55 located at the end of the supporting floor 21 is carried along at the same time. This prevents the animals from jumping off over the free rearward edge of the supporting floor 21.

We claim:

1. An apparatus for housing small animals, comprising:
    a housing enclosure;
    an animal conveyor supporting floor (21), said supporting floor comprising a plurality of intersecting supporting profiles (33) made of a soft elastic material, said supporting profiles being interconnected so as to form a plurality of openings (34) in said supporting floor, said supporting profiles having an interior hollow portion opening downwardly, said supporting profiles forming a plurality of mats (32), said supporting floor being divided into a plurality of adjacent tracks, (25a, 25b, 25c . . . ), each of said tracks comprising a plurality of said mats;
    a plurality of supporting members (38) embedded in said mats and extending in a direction transverse to a conveying direction of said supporting floor;
    lateral conveying members connected to said supporting members for conveying said supporting members and said tracks along said conveying direction; and
    a plurality of soft elastic coverings (40) formed in a region above said supporting members.

2. The apparatus as claimed in claim 1, wherein said elastic material comprises PVC.

3. The apparatus as claimed in claim 2, wherein said supporting members comprise supporting rods (38), and further comprising means (39) for mounting said supporting rods in a lower cross-sectional region of said mats, said mounting means having tubular openings therein for accommodating said rods.

4. The apparatus as claimed in claim 3, wherein said lateral conveying members comprise conveyor chains (51).

5. The apparatus as claimed in claim 4, wherein said supporting profiles have a U-shaped cross-section oriented such that an arc section (35) thereof points upward and legs (36, 37) thereof point downward.

6. The apparatus as claimed in claim 1, wherein said soft elastic coverings comprise a plurality of bead-like elastic resilient hollow bodies (40) formed on an upper surface of said mats.

7. The apparatus as claimed in claim 6, wherein said hollow bodies project at least partially upward beyond an upper surface of said mats to form lateral supporting areas for said small animals.

8. The apparatus as claimed in claim 1, wherein said elastic coverings project at least partially upward beyond an upper surface of said mats.

9. The apparatus as claimed in claim 1, further comprising means (41–47) for coupling said mats of any one of said tracks together to form said any one of said tracks.

10. The apparatus as claimed in claim 9, wherein said coupling means comprises a lower (41) and an upper (45) profile which clampingly interconnect adjacent mats (32).

11. The apparatus as claimed in claim 10, wherein said lower profile is rigid and includes first and second clamping legs (42) which engage and fit into said hollow portions of supporting profiles (33a) located at confronting ends of adjacent mats (32), said first and second clamping legs being fixed to said end supporting profiles by said upper profile and clamped thereto.

12. The apparatus as claimed in claim 11, wherein said upper profile includes transversely directing projecting noses (46) which deform and clamp outermost legs (36, 37) of said end supporting profiles with said lower profile clamping legs (42).

13. The apparatus as claimed in claim 9, wherein said mat coupling means includes a soft resilient covering (47) located on a top portion thereof, said soft resilient covering being made of a foam material.

14. The apparatus as claimed in claim 13, wherein said soft resilient coverings include a rounded bead-shaped top portion which projects upward from a plane of said mats being coupled.

15. The apparatus as claimed in claim 1, further comprising means (41–47) for clamping and coupling adjacent mats (32) together, said clamping and coupling means comprising lower and upper profiles (41, 45).

16. The apparatus as claimed in claim 1, further comprising laterally extending U-shaped rails (49, 50) supported on vertical supporting legs (52), said rails guiding said lateral conveying members.

17. The apparatus as claimed in claim 16, further comprising transverse girders (53) and longitudinal supports (54), said transverse girders interconnecting and supporting said supporting legs, and said longitudinal supports interconnecting and supporting said transverse girders.

18. The apparatus as claimed in claim 17, wherein said longitudinal supports comprise tubes.

19. The apparatus as claimed in claim 18, further comprising a heating system located beneath said tracks for supplying a heating medium through an interior tubular section of said longitudinal supports.

20. The apparatus as claimed in claim 1, further comprising a heating system located beneath said tracks which includes means for conveying a heating medium beneath said tracks.

* * * * *